United States Patent

[11] 3,575,599

[72] Inventor Georg S. Mittelstaedt
 274 73rd St., Brooklyn, N.Y. 11209
[21] Appl. No. 804,931
[22] Filed Mar. 6, 1969
[45] Patented Apr. 20, 1971

[54] RADIOGRAPHIC EXPOSURE CONTROL SCREEN FOR THE DEFINITION OF DETAIL OF BOTH HARD AND SOFT SUBSTANCE
 2 Claims, 1 Drawing Fig.
[52] U.S. Cl.................................................. 250/80, 250/71
[51] Int. Cl.................................................. H01j 1/62
[50] Field of Search........................................ 250/71.5, 80, 71

[56] References Cited
 UNITED STATES PATENTS
 2,740,050 3/1956 Schultz.......................... 250/80
 3,426,195 2/1969 Menefee et al................. 250/71.5

*Primary Examiner*—Archie R. Borchelt
*Assistant Examiner*—Davis L. Willis

ABSTRACT: The invention relates to a radiographic exposure control screen. It comprises a fluorescent layer and a visible light opaque layer, and is characterized in that the fluorescent layer diminishes penetrating rays selectively.

The fluorescent layer has a low response value. Only the varied high intensity rays emanating from the thin object areas will cause fluorescence, and these strong rays will loose some of their intensity and energy in causing the fluorescence. The weakened rays will improve the definition of detail of thin object areas. It is well known in radiography, that relatively weak rays will define detail of soft substance.

The weak rays emanating from dense object areas are not causing fluorescence, and therefore are not diminished by causing fluorescence, and will define the dense object areas.

It can be seen that detail of both hard and soft substances will be defined in a radiograph.

RADIOGRAPHIC EXPOSURE CONTROL SCREEN FOR THE DEFINITION OF DETAIL OF BOTH HARD AND SOFT SUBSTANCE

This invention primarily relates to radiography and photography and particularly relates to means and methods to improve the definition of detail.

It is well known that is regular radiographs high intensities of penetrating radiation must be employed to define detail in hard substance e.g. bones, but then soft tissue e.g. flesh will be overexposed and appear in a developed negative black or dark and vague, with little or no definition of detail.

Conversely, relatively low intensities of penetrating radiation will define detail in soft tissue, but then hard substance will be underexposed and appear too light and vague, with little or no definition of detail.

According to the present invention, the simultaneous solution to both of these problems lies in the use between the object and a ray sensitive surface of my ray-intensity control screen. In this screen, the high intensities of the ray image are selectively diminished, resulting in the definition of detail in both dense and thin object areas.

The "control screen" as it will be called from here on, is a fluorescent screen with a visible light opaque-penetrating ray transparent layer on the ray exiting side, or on both sides, or enveloping the fluorescent screen. The control screen is interposed between object and film or other light sensitive surface or area.

The control screen controls, that is, selectively diminishes the varied high intensities of penetrating radiation emanating from the object, to selectively lower the exposure of the relatively thin object areas.

In greater detail, the varied high intensity rays emanating from a thin object area will produce varied fluorescence in the immediate control screen area through which they pass, the fluorescence consuming part of the ray energy in proportion to the degree or magnitude of fluorescence, thereby diminishing the high radiation intensities selectively. The now weaker rays will define the density variations in the thin object areas.

The rays emanating from somewhat denser object areas will produce less fluorescence in the control screen and therefore will be diminished to a lesser degree, and the rays from very dense object areas—if any—will hardly cause any fluorescence in the control screen. Therefore the rays from these very dense object areas will hardly be diminished by control-screen fluorescence.

It can be seen that the control screen will selectively diminish the higher ray intensities emanating from the object. The varied intensities from relatively thin object areas will be selectively diminished, but the low intensities from dense object areas will remain relatively unchanged. The result is definition of detail in both dense and thin object areas.

With the use of this control screen, the initial ray intensities can be somewhat higher than usual, to obtain improved definition of detail in hard substance. The interposed fluorescent control screen will automatically and selectively diminish the excessive radiation intensities emanating from the soft tissues.

The main objects of this invention are to control the high radiation intensities emanating from thin object areas, and to improve the definition of detail.

These and other objects will become apparent in the description below, in which characters of reference refer to like-named parts in the drawing.

The drawing is schematic and illustrates the principles of the invention, but the invention and application is not limited to the particular examples illustrated, nor to the particular construction shown.

The features are shown in greatly enlarged form in the diagrammatic drawing.

Referring briefly to the drawings.

Figure 1:
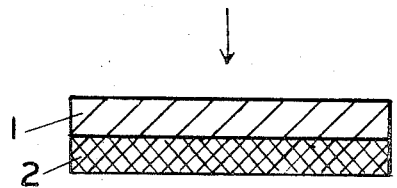
FIG. 1 illustrates an embodiment of the invention showing a ray control screen comprising a fluorescent layer and an opaque layer on the ray exiting side of the fluorescent layer.

Referring in greater detail to the drawing, the numeral 1 in FIG. 1 indicates a fluorescent layer, and the numeral 2 indicates a visible light opaque-penetrating radiation transparent layer on the ray exiting side of the fluorescent layer 1. The arrow (in this FIG. and in all other FIGS.) indicates the direction of the penetrating radiation emanating from an object. The fluorescence of the layer 1 will consume ray energy in proportion to the degree of fluorescence, and therefore will diminish the high intensities of the penetrating rays emanating from the thin object areas in proportion to the magnitude of fluorescence. The opaque layer 2 will confine the fluorescent light. Relatively weak rays from dense object areas will hardly cause fluorescence and therefore will be relatively undiminished. Therefore, with the use of this control screen, both dense and thin object areas will be defined.

The basic parts and features will be given the same numerals in all FIGS. as is practicable.

Figure 2:
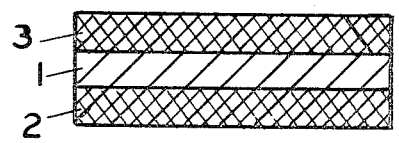
FIG. 2 shows a fluorescent layer and opaque layers on both sides of the fluorescent layer.

FIG. 2 shows a control screen with opaque layers on both sides of the fluorescent layer 1. The opaque layer 3 is shown on the ray entering side of the fluorescent layer 1, and the opaque layer 2 is shown on the ray exiting side of the fluorescent layer 1. Of course, the positions could be reversed. It is important in this invention that all the fluorescent light generated in the control screen is confined in the screen. This fluorescence is not to illuminate or for producing exposure; it is only to selectively diminish overly high ray intensities. In this device, the varying high radiation intensities from relatively thin object areas are diminished in the fluorescent layer 1 of the control screen in proportion to the degree or magnitude of fluorescence they cause. The opaque layers 2 and 3 will effectively confine the fluorescence of the layer 1 within the control screen, and the selectively diminished ray intensities will define the density variations in relatively thin object areas. The low ray intensities emanating from the dense object areas will cause little or no fluoresce in the control screen. They will remain relatively undiminished and will define the dense object areas. Therefore both dense and thin object areas will be defined. The arrow indicates the direction of penetrating rays emanating from the object.

Figure 3:
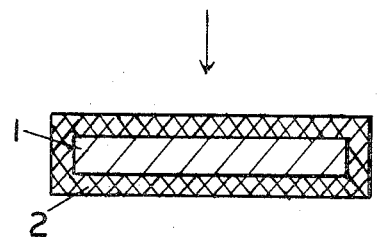
FIG. 3 shows a fluorescent layer and an opaque layer completely enclosing the fluorescent layer.

FIG. 3 is similar to FIGS. 1 and 2, but here the opaque layer 2 completely encloses the fluorescent layer 1, to fully confine the fluorescent light in the control screen. The arrow indicates the direction of penetrating radiation emanating from the object.

Figure 4:
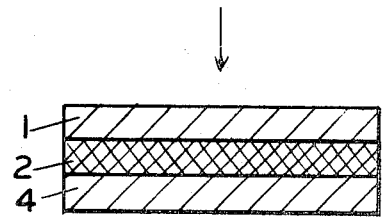
FIG. 4 shows two fluorescent layers and an opaque layer between the two fluorescent layers.

FIG. 4 shows two fluorescent layers 1 and 4 and a visible light opaque-penetrating ray transparent layer 2 between the two fluorescent layers. The fluorescent layer 1 diminishes the penetrating rays from the relatively thin object areas in proportion to the degree of fluorescence they cause, and the opaque layer 2 confines the fluorescence. The fluorescent layer 4 is either an intensifying screen or a fluoroscopic screen. Again, the arrow indicates the direction of penetrating radiation emanating from the object. The result of this arrangement is definition of detail in both dense and thin object areas.

Figure 5:
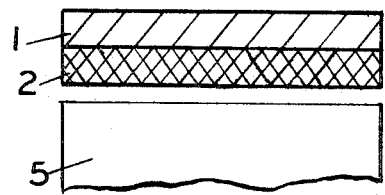
FIG. 5 shows the ray intensity control screen of FIG. 1 disposed ahead of an image intensifier tube.

FIG. 5 shows a control screen similar to that of FIG. 1, showing a fluorescent layer 1, and an opaque layer 2 on the ray exiting side of the fluorescent layer 1. Here, the control screen is placed immediately ahead of an image intensifying tube 5 for electronic magnification. The arrow indicates the direction of penetrating radiation emanating from the object. The fluorescent layer 1 will diminish the high intensity radiation emanating from thin object areas, and the opaque layer 2 will confine the fluorescent light.

Figure 6:
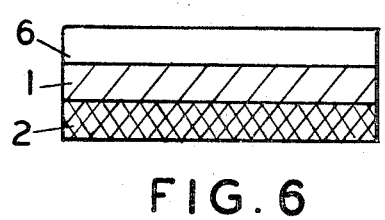
FIG. 6 is similar to FIG. 1, but it shows a separate support for the control screen.

FIG. 6 shows a control screen similar to that of FIG. 1, but it shows a support 6. The fluorescent layer 1 is disposed on the support 6, and the opaque layer 2 is disposed on the ray exiting side of the fluorescent layer 1. The arrow indicates the direction of the penetrating rays emanating from an object.

The control screen may be used in combination with any ray sensitive surface or device and may be disposed ahead of a sensitive photographic film, or of an intensifying screen, or fluoroscopic screen, or ahead of an image intensifier tube, or ahead of any other light sensitive surface or device.

It is to be noted that the fluorescence of the control screen is only used to selectively diminish the penetrating rays emanating from the relatively thin object areas. This fluorescent light is not for illumination or exposure.

There must be a visible light opaque-penetrating ray transparent screen or layer at least on the ray exiting side of the fluorescent layer of the control screen, but for highest efficiency the opaque screen or layer must be disposed on both sides of the fluorescent layer, or all around the fluorescent layer, perhaps in the form of a covering or envelope, to completely cover the fluorescent layer.

To be efficient, the opaque layer must be completely impervious to the visible fluorescent light, but must be penetrating ray transparent. The opaque layer may consist of light metal e.g. aluminum, light alloys, plastics, compounds, pigments e.g. lamp black, opaque cardboard, paper or paints, or may consist of any other opaque material.

The opaque layer may be a separate layer, or may be attached to or be part of the fluorescent layer in the control screen. The opaque layer may also be part of a casette or of some other radiographic element or device used in combination with the control screen; or any other means or method may be used to limit the visible fluorescent light of the control screen.

The opaque layer may serve as support for the fluorescent control screen layer or vice versa, or there may be a separate support.

The control screen is placed ahead of a light sensitive surface or area e.g. a sensitive photographic film, an intensifying screen, a fluoroscopic screen or an electronic intensifier, but combinations can be made, and this forms part of this invention.

For instance, a control screen-intensifying screen combination may be made comprising two fluorescent layers and an opaque layer between the two fluorescent layers. The opaque layer may be a separate sheet or may be attached to either fluorescent layer or to both layers. The front fluorescent layer in combination with the opaque layer is a control screen, and the back fluorescent layer is an intensifying screen.

Likewise, a control screen-fluoroscopic screen combination may be made comprising two fluorescent layers and an opaque layer between the two fluorescent layers. Here too, the opaque layer may be a separate sheet or may be attached to either fluorescent layer or to both. The front fluorescent layer in combination with the opaque layer is a control screen, and the back fluorescent layer is a fluoroscopic screen.

Any other control screen-sensitive surface combination may be made. This includes control screen-photographic film combinations, control screen-electronic intensifier combinations, or any other combinations. All this forms part of this invention.

It is important that the high intensities from thin object areas will cause effective fluorescence in the control screen. It is also important that the low intensities from dense object areas will not cause effective fluorescence in the control screen. To that end, I use fluorescent material of a low order number in the fluorescent control screen layer, and/or I add efficiency-reducing impurities known as poisons or killers to the fluorescent material. Iron and nickel, for instance, are such efficiency reducing substances, and as little as 0.00001 percent of iron or nickel poison discernible decreases the efficiency in pure zinc sulphide. I propose to use in my selective control screen (for normal use) up to 1 percent of iron or nickel poison, or both, and if higher ray intensities are employed up to several percent or higher.

Other killer or poison substances may be used.

Other examples of fluorescent crystals are calcium tungstate and cadmium borate.

It can be seen that the high ray intensities from thin object areas will cause fluorescence in the control screen areas through which they pass, but the low ray intensities from dense object areas will not cause notable fluorescence in the control screen areas through which they pass. The high ray intensities from thin object areas will be diminished by the fluorescence to define the density variations in thin object areas, but the low intensities from dense object areas will not be diminished by fluorescence and therefore will define detail in the dense object areas.

The control screen may be used ahead of any ray sensitive screen e.g. an intensifying screen; but instead of or in addition to using an intensifying screen, a photographic emulsion may be treated with a fluorescent substance to transform the short wave lengths of the penetrating rays into longer ones, for augmenting the exposure caused by the penetrating rays. The ethyl carboxylic ester of dihydrocollodium for instance is suited for this purpose.

Examples of penetrating rays are X-rays, alpha, beta, gamma rays etc.

This invention may also be used to improve the definition of detail in exposed and developed radiographic and photographic film. Here, penetrating rays are passed through the developed film, then through the described control screen, and then to a ray sensitive surface. The image may then be further processed. The high intensity rays emanating from the light film areas are diminished in the fluorescent control screen layer in proportion to the degree of fluorescence. This is important to define the light film areas. The low intensity rays from dense and dark film areas will not produce any effective fluorescence and therefore will not be diminished by fluorescence. This is important for the definition of detail in the dense and dark film areas. It is also to be noted that in this application of the invention, the density differentiations invisible inherent in the dark film areas will be defined in the resulting radiograph.

In the text and claims, by "intensity" is also meant energy or magnitude of radiation; by "opaque" is meant visible fluorescent light impervious-penetrating ray transparent; by "opaque layer" is also meant an opaque screen, covering or envelope, or an opaque part of a casette or of some other radiographic element or device used in connection with the control screen; by "fluorescent" is also meant phosporescent; by "visible light" is also means visible fluorescent light; by "film" is also meant photographic film; by "object" is also meant exposed and developed photographic or radiographic film; by "surface" is also meant area; by "layer" is also meant sheet, screen and vice versa; by "X-rays for normal use" is meant up to about 100 K.V.

The principles involved in this invention may be applied to all fields of radiography and/or photography, and changes may be made without departing from the spirit or scope of the invention.

I claim:

1. In a radiographic exposure control screen comprising a fluorescent layer and an opaque layer limiting the fluorescent light, sufficient killer substance in the fluorescent layer to prevent fluorescence under the weak rays emanating from dense object areas.

2. In a radiographic exposure control screen comprising a fluorescent layer and an opaque layer limiting the fluorescent light, low response fluorescent material in the fluorescent layer responding only to the strong rays emanating from relatively thin object areas, the fluorescence diminishing said strong rays in proportion to the degree of fluorescence, resulting in improved definition of detail of the thin object areas; the weak rays emanating from the dense object areas not causing effective fluorescence and therefore being undiminished by fluorescence, resulting in definition of detail of the dense object areas.